May 26, 1925.

B. E. TAYLOR 1,538,911

APPARATUS FOR PROPELLING LIQUIDS

Filed April 20, 1923  5 Sheets-Sheet 1

Burt E. Taylor INVENTOR

BY

ATTORNEY

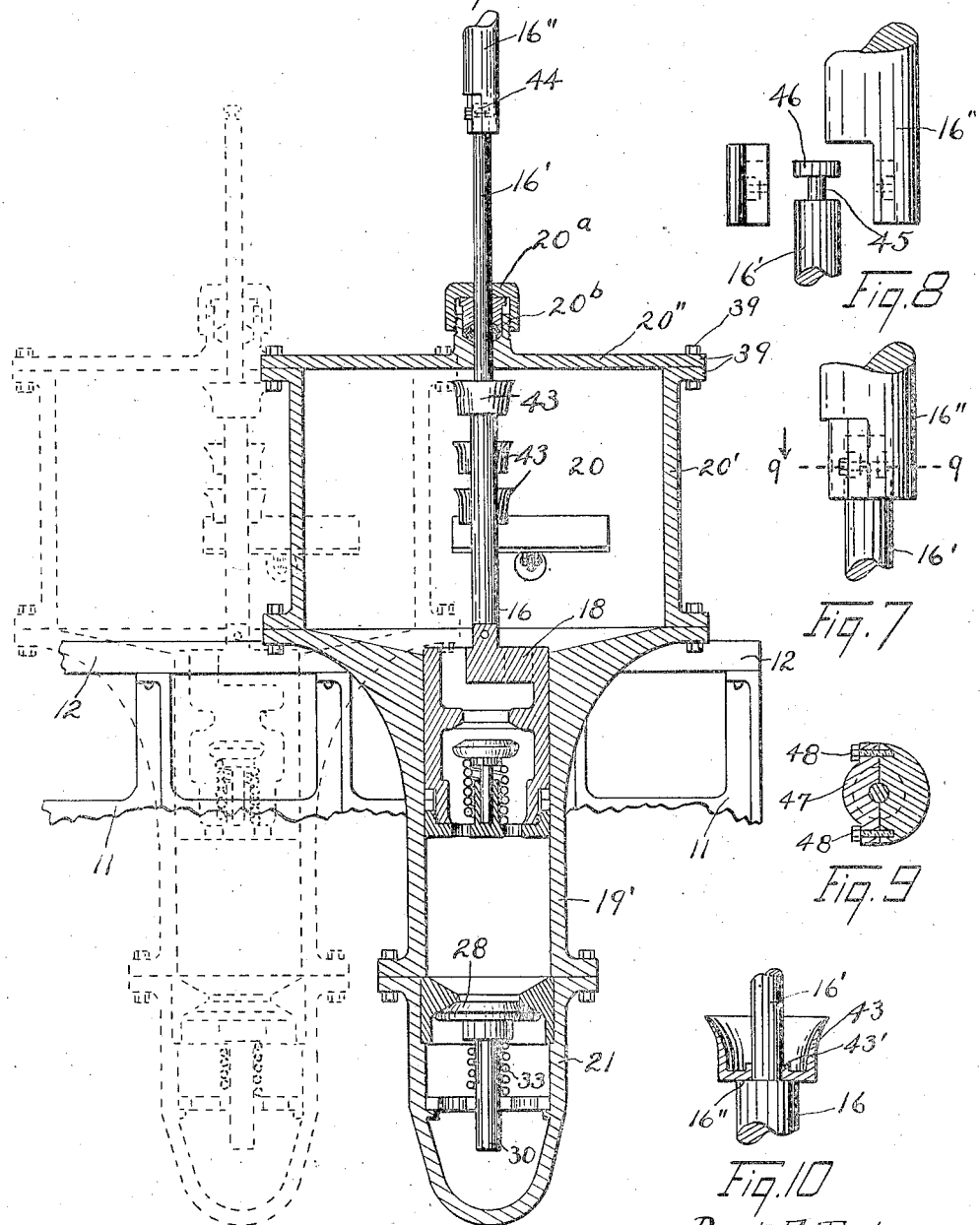

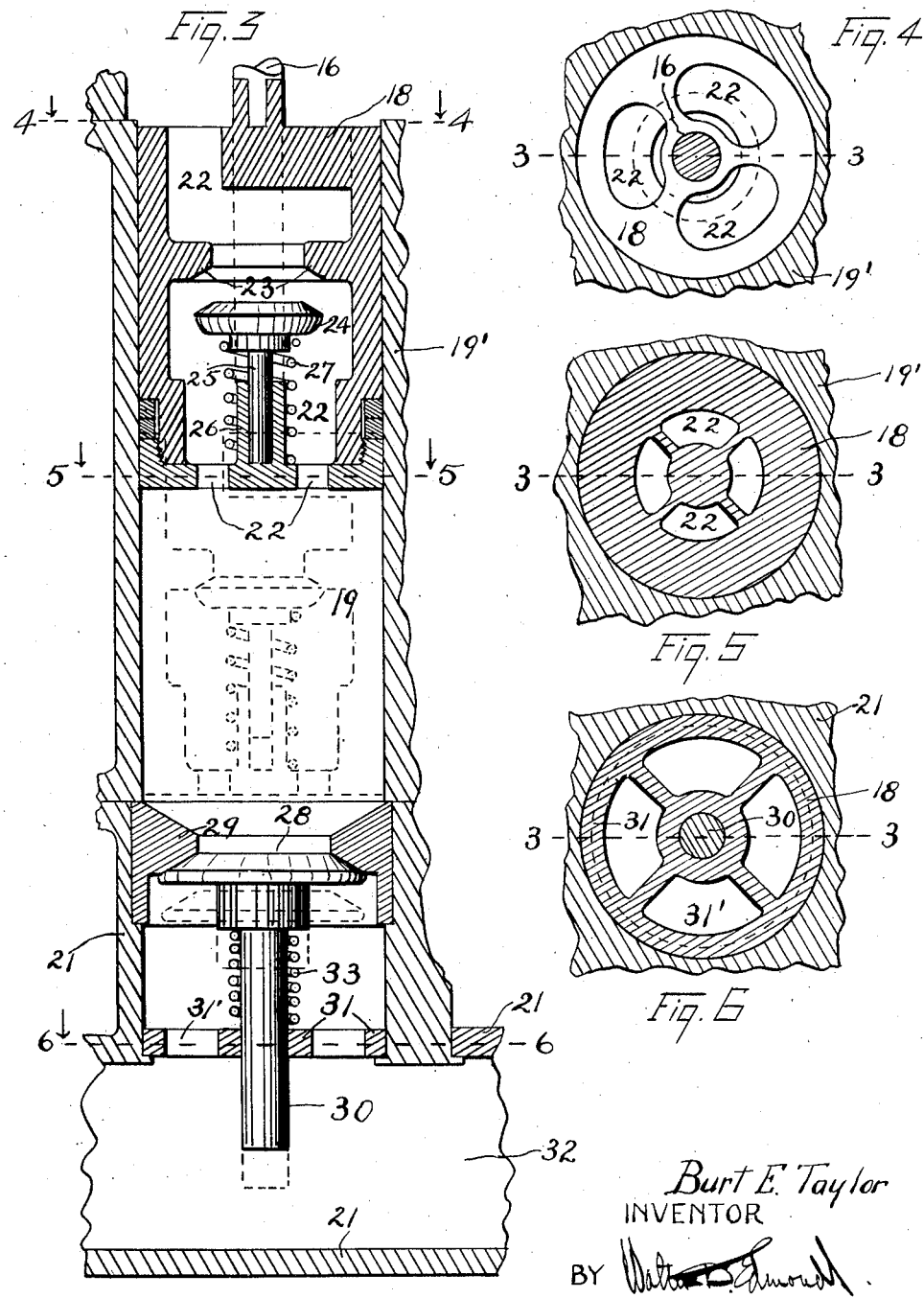

May 26, 1925.  1,538,911
B. E. TAYLOR
APPARATUS FOR PROPELLING LIQUIDS
Filed April 20, 1923  5 Sheets-Sheet 4
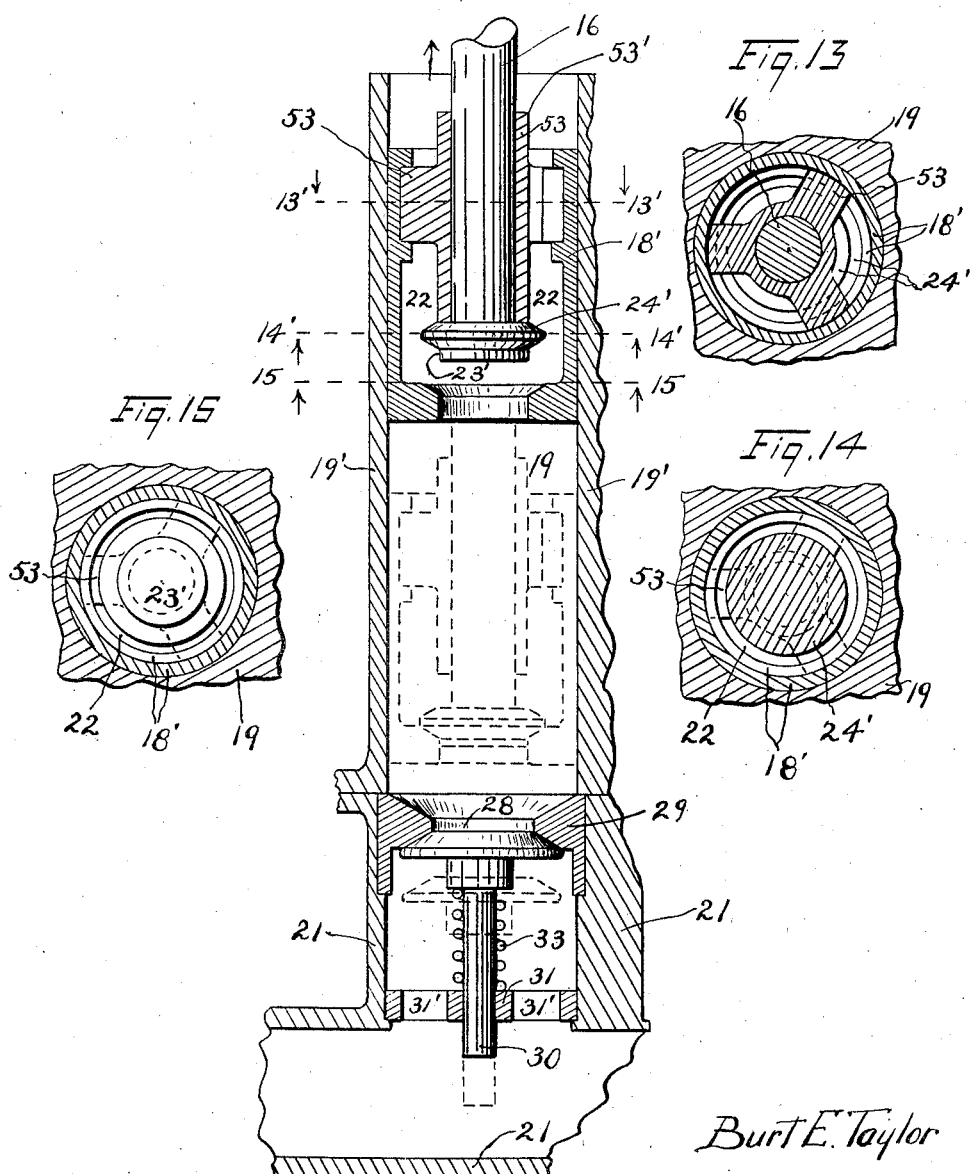
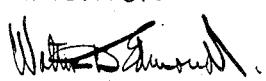
INVENTOR
BY
ATTORNEY

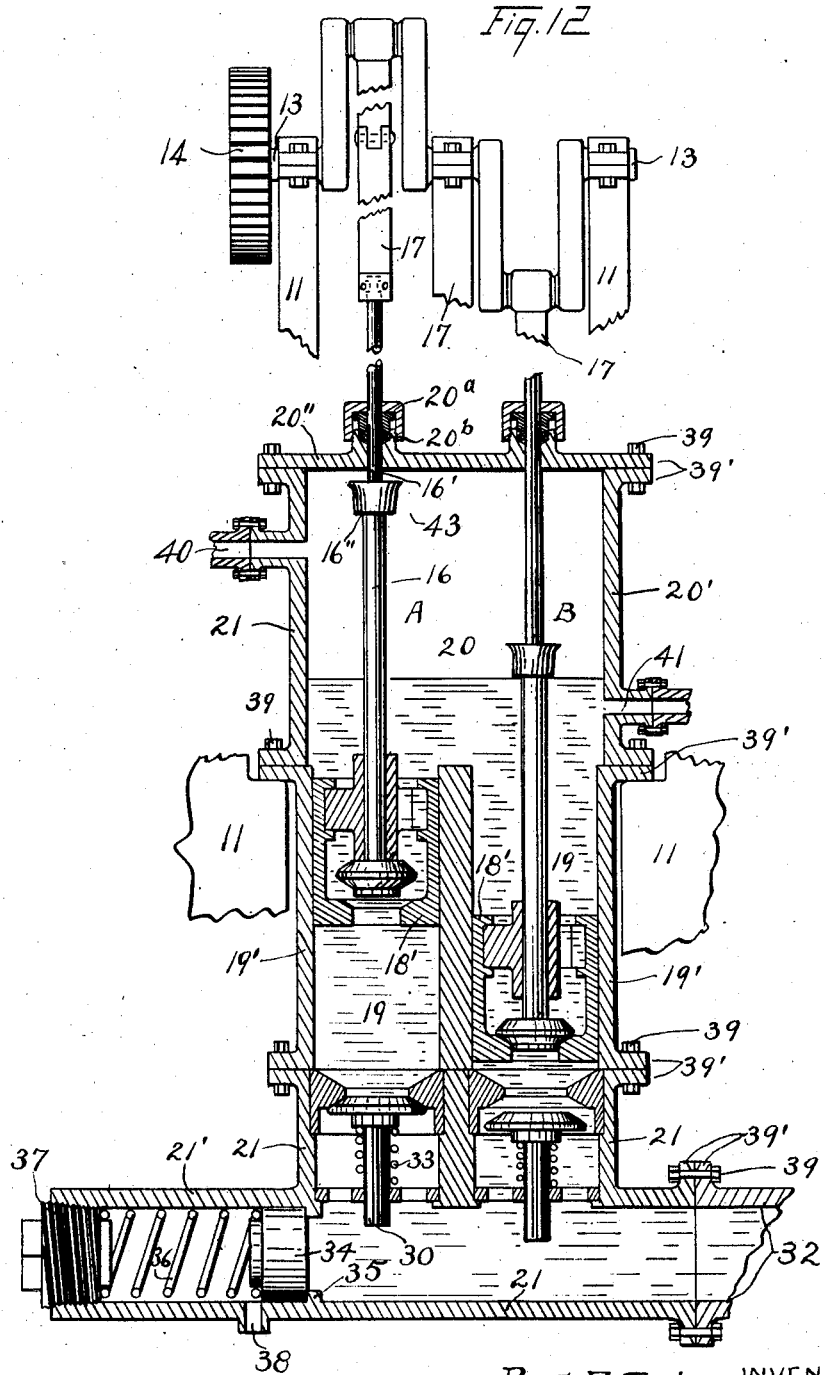

Patented May 26, 1925.

1,538,911

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

APPARATUS FOR PROPELLING LIQUIDS.

Application filed April 20, 1923. Serial No. 633,404.

*To all whom it may concern:*

Be it known that I, BURT E. TAYLOR, a citizen of the United States, and a resident of Mount Vernon, county of Westchester, and State of New York, have invented a certain new and useful Apparatus for Propelling Liquids, of which the following is a specification.

My present invention relates to the propulsion of liquids, or semi-liquids, including particularly emulsions such as milk containing therein suspended solids; and its objects comprise provision of more readily than heretofore openable and cleansable means whereby the propulsion is effected with less than the hitherto detrimental agitations, percussions, and compressions progressively locally caused as by ordinary pumping. In aid of which, and otherwise advantageously, my invention also comprises the combination with said means of devices whereby the propelled liquid, and therewith contacting instrumentalities, are, during operation, relieved as much as possible, from detrimental atmospheric contacts and pressures.

My invention is particularly beneficial when applied to milk, some constituents of which are peculiarly sensitive to atmospheric infections or changes detrimental for some purposes, and caused by undue compression, or friction, resulting in breakage and smearing of the butter fat globules.

I attain my objects by aid of instrumentalities, and combinations thereof, such as are illustrated in the accompanying drawings, in which Figure 1 is a mostly sectional, and partly front elevation, of principal parts of one form of my apparatus, parts of some elements being broken away;

Figure 2 is a similar, but side, view of some of the parts shown in Figure 1, the dotted lines indicating their abnormal position when moved out for cleansing, etc., sections being on line 3' of Fig. 1.

Figure 3 is, on enlarged scale, a central vertical sectional view of part of my conduit, and my therein piston and the therewith cooperating valves, the latter and their stems being shown in elevation.

Figure 4 is a cross sectional view on the line 4—4 of Figure 3.

Figure 5 is a cross sectional view on the line 5—5 of Figure 3.

Figure 6 is a cross sectional view on the line 6—6 of Figure 3.

Figure 7 is, on enlarged scale, a detail fragmentary view showing one of my openable piston rod joints;

Figure 8 is a view of the disassembled parts shown in Figure 7;

Figure 9 is a sectional view on the line 9—9 of Figure 7;

Figure 10 is, on enlarged scale, a detail fragmentary view showing one of my piston drip collectors in section, and. in elevation, a part of the therewith associated piston;

Figure 11 is a view, partly in elevation, and mostly sectional, illustrative of a modified form and arrangement of my piston and therein operated valve.

Figure 12 is a view similar to that of Figure 1 but showing the modified form of Figure 11 in a two cylinder apparatus and omitting some parts shown in Figure 1;

Figure 1:
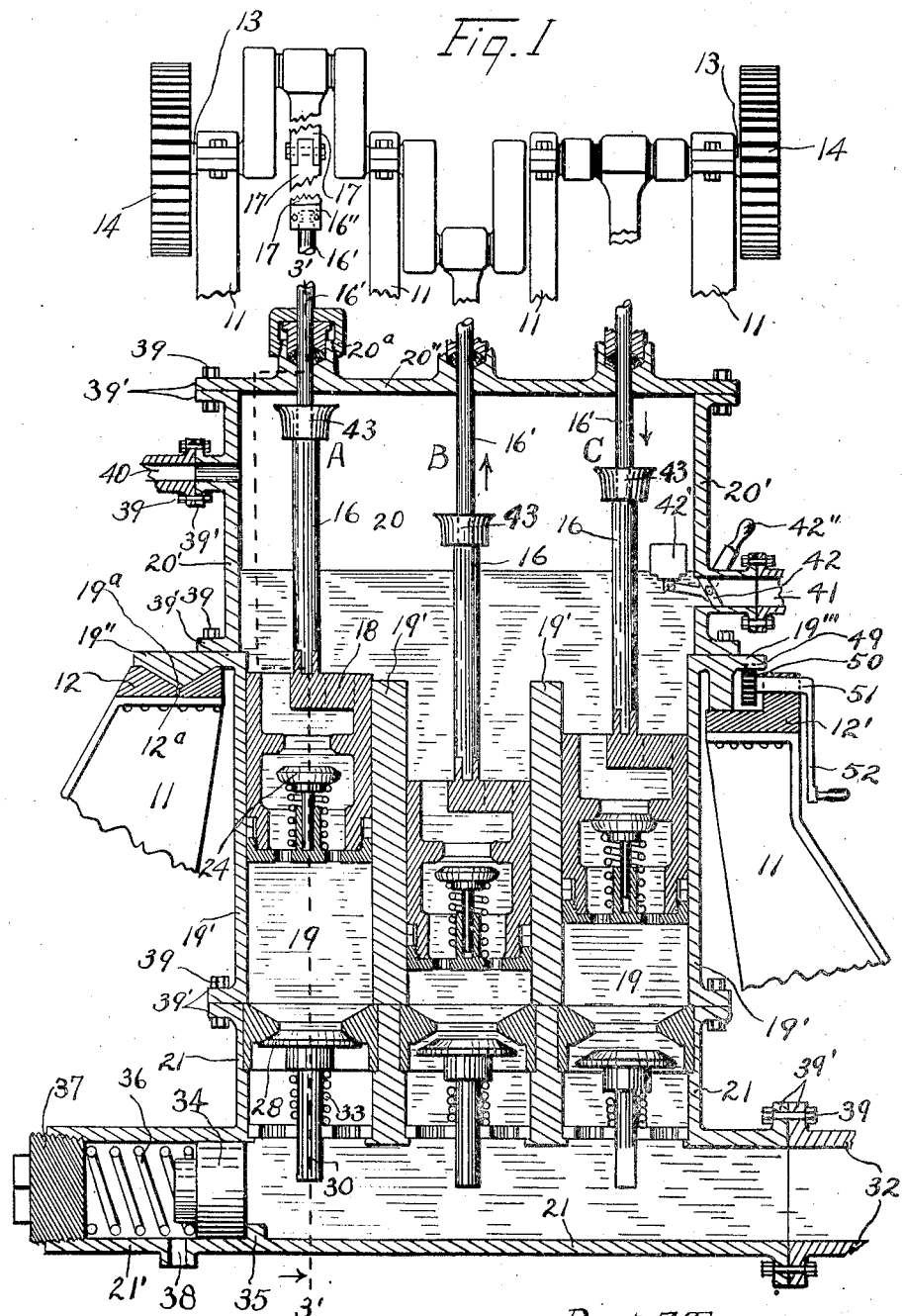

Figures 13, 14, and 15 are cross sectional views of the form shown in Figure 11 on lines numbered respectively according to the numbers of said figures.

Similar numerals refer to similar parts throughout the several views.

In the drawings some elements of my apparatus are merely suggestively, or fragmentarily, indicated because believed to be too familiar and variable in form, construction and operation to require more definite or complete representation. For example, I employ for support any suitable form or construction of frame, or frames, fragments of which are indicated by 11. also of thereby carried ways by 12, 12', (Figs. 1 and 2); also means for vertically reciprocating my hereafter described pistons such, for example, as a usual crank shaft, 13, mounted in the frame 11, rotated by aid of gears 14 driven, as usual, by aid of suitable connections with a source of power (not shown), and operatively combined by any suitable means such for example as connecting rods 17, etc. with the piston rods A, B, C, (Fig. 1), each comprising parts thereof respectively designated as 16, 16', 16''.

Some of the members, or parts, comprised in my apparatus are, as hereafter described, detachably air-tightly coupled together by aid of usual flanges, bolts, etc. diagrammatically indicated in the drawings.

My apparatus comprises an enclosed tank, or reservoir, 20, for the accumulation of the liquid in quantity sufficient to ensure operation during which air is, as far as possible, exhausted and kept from within the reservoir as hereafter described. The reservoir is enclosed by side walls, 21, hermetically detachably united to a hereafter described sub-disposed multiple cylinder casting, 19', by any convenient means, for example by aid of suitable bolts, 39, flanges 39', and usual intervening packings (not shown). The casting serves as the bottom of, and its cylinders 19 as outlets for the liquid from, the reservoir. The reservoir is further enclosed by a cover plate 20'' also similarly hermetically detachably coupled with the side walls 20'.

Referring now more particularly to my novel pistons, 18, each of these is reciprocated within one of the therewith cooperative cylinders 19. It will be understood that a single cylinder 19 and piston 18 with therewith cooperative parts might be employed, but I usually prefer to employ three alternately reciprocating as shown in Figure 1, thereby securing steadier flow and avoiding shocks incident to too comprehensively checking it. To the casting 19' is hermetically coupled another casting 21 carrying supports and seats for valves hereinafter described and containing a manifold discharge passage for liquid from the cylinder to the main discharge pipe, 32 (Fig. 1) which extends therefrom to the place of delivery (not shown), the casting 21 being hermetically detachably coupled with the pipe 32. Each cylinder 19, opens, at its lower end, into one of the manifolds in the casting 21. Each piston 18 has a therethrough extending passage 22 for the liquid and carries a valve seat, 23, with which cooperates a valve 24, having a stem 25, slidably mounted in a suitable cylindrical support 26, carried by the piston. An expansile spring 27 encircling the stem constantly tends to normally seat the valve during outstrokes of the piston. (In Figure 3 the relative positions of the parts during and at the end of the instrokes are shown in full, and during and at the end of the outstrokes in dotted lines.)

In each of the multiple discharge openings of the casting 21 which register communicatingly with the cylinders, 19, I provide a similar valve 28 cooperating with a seat 29, carried by the casting 21 beyond the limit of the outstrokes. This valve has a stem 30 slidably mounted in a plate 31 carried by the casting and having therethrough openings 31' for the liquid. The stem is encircled by an expansile spring 33, bearing against the valve head and the plate and tending constantly to seat the valve during instrokes of the piston, thereby served.

I also provide, when indicated, means to further relieve undue shocks, or pressures on the parts, or on the liquid during outstrokes. Such means for example as shown in Figure 1 comprise a valve head 34 reciprocatable in a therewith cooperative extension 21' of the casting 21, to one side of its main passage for the liquid. The head 34 is constantly yieldingly impelled to its normal bearing against a stop 35 by an expansile spring 36 bearing against it and against an ordinary screw plug 37 whereby the tension of the spring is adjustable. I further provide a relief vent 38 in the extension 21' to accommodate an accidental intensity of liquid pressure so great as to force the head inwardly beyond such vent.

The side walls 20' of the reservoir 20 contain a therethrough outlet, or exhaust, conduit, 40, located above the predetermined level of the liquid in the reservoir, and through which air is withdrawn from within the reservoir, by aid of a vacuum pump or other usual means (not shown). The reservoir is also provided with an inlet or supply conduit 41, located below said level and through which the liquid is, as required, introduced to the reservoir by aid of any suitable means (gravity preferred) from any convenient source (not shown).

Any convenient means are also employed to automatically control the infeed so as to maintain the liquid at said predetermined level. Such means may comprise, for example, a butterfly valve 42, pivoted within the conduit 41 and suitably connected with a float 42'. Such well known parts and a therewith suitably connected lever 42'' for manually moving the valve when required being diagrammatically indicated in Figure 1.

The above referred to cover 20'' of the reservoir contains openings for passage therethrough of the portions 16' of the piston rods and carries, preferably on the outside of the reservoir, ordinary stuffing boxes 20ᵃ, containing usual packing 20ᵇ and each adapted to hermetically cooperate with a piston rod when reciprocated therethrough and through the cover.

It will be noted that my construction is such that the cover, the boxes, and the packing as well as the therethrough reciprocating portions of the piston rods are uncontactable by the liquid in the reservoir.

But, to ensure complete exclusion from the liquid of any oil, particles of wear from packing or rods, or other impurities, each of the rods carries at a location thereon such as to be constantly above the predetermined normal level of the liquid and incollidable with the cover an upwardly and outwardly flaring therefrom withdrawable concentric cup-shaped drip collector 43.

To ensure suitable support of the collectors, or their withdrawal for emptying, cleansing, etc. those portions 16' (Fig. 10)

of the rods extending above the bottom of the collectors are made of less diameter than those (16) below, thus providing on the rods shoulders, or seats, 16" upon which the collectors rest; said bottoms containing openings 43' (Fig. 10) concentric with the rods and dimensioned to closely, but slidably, embrace their smaller diametered portions 16'.

The piston rods comprise two parts or sections, 16', 16", which are disconnectably joined together by any suitable interlocking means 44 located outside of or above the reservoir. In the present instance such interlocking means comprise (Figs. 7, 8, 9) a neck 45 of reduced diameter carried by the part 16' and carrying a head 46 of not greater diameter than said part, and a recess within the part 16" conformed to permit insertion thereinto or withdrawal therefrom of said neck and head, and, by aid of a clip, 47, thereto detachably secured by screws 48, to retain the head and neck in normal position during operation and thus ensure operable integrity of the piston rod as a whole. The head being of no greater diameter than the portion 16' of the rod enables the cover to be lifted off of the rod and the drip collector to be slipped off of the rod when the parts are disconnected.

It will be noted that my construction is such as to admit of disconnection of the reservoir together with my therewith coacting propelling devices from the remainder of the apparatus whenever required for repairs, cleansing, etc. When this occurs, it is convenient, if not indispensable, to be able to move the disconnected parts as a group away from the therewith normally connected immovable conduits, reciprocating means, etc., thereby facilitating access and manipulation.

To that end I provide not only the stationary ways 12, 12', carried by the frame 11 (Fig. 1), but also therewith coacting runners carried by the multiple casting 19', one of which runners 19" is of triangular cross section, as shown, thus providing a rib, 19ª, reciprocatable in a thereto corresponding groove 12ª, in the way 12, thereby preventing transverse displacement of the parts, and the other runner member, 19''' carries a rack 49 (indicated by dots in Figure 1) meshing with a geared wheel 50, carried by a shaft 51, mounted in the way 12' and manually rotatable by aid of the crank, or handle, 52, by turning which it follows that the casting 19' and therewith movable parts can, when disconnected from those permanently stationary, be caused to slide away from the latter to the positions indicated by dotted lines in Figure 2. When thus separated, the construction is such that by merely withdrawing its various bolts, 39, the cover 20" of the reservoir becomes removable from the walls 20', and liftable off of the, as aforesaid, previously disconnected rods 16', likewise the side walls 20' from the casting 19', and the latter from the casting 21, thus giving immediate and unembarrassed access to the respective interiors and their respectively contained instrumentalities.

In the modified form, 18', of one of the pistons shown in Figure 11, a valve 24' is, as before, carried within, and a therewith cooperative valve seat, 23', by, the piston, and by the reciprocation of the piston rod 16 the valve is on the outstroke seated to close, and on the instroke unseated to open, the passage 22 for the liquid through the piston. But this modified form dispenses with the valve stem 25, its cylindrical support 26, and the expansile spring 27 shown in Figure 3, and instead thereof the piston carries a frame 53 comprising a cylindrical bearing 53' within which is axially slidably mounted the piston rod 16 which in this instance performs in addition to reciprocating the piston the additional function of carrying the valve 24' and positively seating it before the outstroke of the rod begins to bear upon the piston; while during its reverse movement, or instroke, the rod unseats and lifts the valve until the back thereof abuts against the frame 53 as shown in Figure 11, thereby carrying the piston upwardly while the liquid gravitates down through the passage therein. The dotted lines in Figure 11 indicate the respective positions of the parts during the outstroke, including those of the lower valve 28, and its therewith associated elements which are the same and cooperate in the same way as in the form shown in Figure 3.

It should be noted that in the preferred manner of using my invention not only are the reservoir, 20, and the conduits therefrom to the place of delivery hermetically enclosed, but also the latter itself, although as regards successful operation of certain features of the invention this is not always essential.

Operation: Assuming the parts to be thus sealed, they are preferably exhausted to as near vacuo as industrially practicable, and the liquid or milk supplied to the reservoir 20 until it ceases to flow therefrom by gravity towards the place of delivery. My pistons are then, as above described, reciprocated and liquid thereby propelled to extent required, the liquid supply and exhaust of air being maintained.

The pistons operate as follows: Assuming the form shown in Figure 3 to be at the limit of its outstroke and the valve 28 consequently open and the valve 24 closed, on initiation of the instroke a slight suction will be momentarily exerted tending to aid the spring 33 to firmly seat its valve, thereby there closing the conduit and at the same time such as to unseat the valve 24 notwithstanding its spring 27, thereby opening the passage through the instroking piston and permitting it to rise quietly through the superdisposed gravity impelled liquid, the weight of which fortified by the effect of the upward movement of the piston serves to keep the valve 24 open.

When the outstroke is initiated the directions of pressures are reversed, the spring 27 becomes thereby enabled to seat the valve 24, thereby closing the passage in the piston which is thereby rendered able to push the intervening liquid toward the valve 28 which is thereby unseated, thus opening the conduit towards the place of delivery and permitting the liquid to be further pushed onwards therethrough until the limit of the outstroke is reached, after which the cycle of movements is indefinitely repeated.

As regards the modified form of my piston shown in Figure 11, the operations of the parts and their cycle are the same as above described in substance and in effect upon the liquid, the difference in construction enabling the spring 27 to be dispensed with and the valve 24' to be more positively unseated and seated by its direct connection with the piston rod 16.

My construction is such that the liquid itself is never disturbingly moved by suction, but merely by gravity and by thereto rearwardly applied onward pushes from the then closed piston which to regain its thus propulsive position as it were rises smoothly past the thereby contained and gravity affected liquid.

My construction is, as above referred to, permissive of convenient and economical disassemblage of certain parts for cleaning and repair. To that end, it is only necessary to open the above described couplings whereupon the reservoir with its thereto connected casting containing the pistons and therewith cooperative elements, cylinders, valves, seats, springs, etc. become as a unit separable from the remainder of my apparatus and as aforesaid readily removable to a more accessible location where further dismemberable to afford access to interiors and therein contained elements.

Having now described my invention, what I claim as new and desire to secure by Letters Patent is the following, viz:

1. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; an air-tight conduit for the liquid extending from said reservoir to the place of delivery of the liquid; a piston operating wholly within, and having a therethrough passage for the liquid communicating with, said conduit; a valve slidable within the piston normally closing said passage; and means to reciprocate the piston whereby the valve is actuated by the piston movement to alternately close and open said passage.

2. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a conduit for the liquid extending from the reservoir to the place of delivery of the liquid and also a downwardly extending cylinder located below the level of the liquid in the reservoir; and a piston sliding wholly within said cylinder and at all times below said liquid level and having a passage therethrough for the liquid.

3. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; an air-tight conduit for the liquid and also a downwardly extending cylinder located below the bottom of the reservoir; a piston operating wholly within the cylinder containing a passage therethrough for the liquid; means comprising a valve slidable within the piston to close the passage during the outstroke and open it during the instroke of the piston; and means comprising a separate valve carried within the conduit below and in alinement with the piston to close the conduit during the instroke and open it during the outstroke of the piston.

4. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a downwardly extending conduit for the liquid; a piston operating wholly within said conduit and containing a passage therethrough for the liquid, means to reciprocate the piston; means comprising a valve carried within the piston to alternately close and open said passage, and means comprising a separate valve arranged within the conduit below and in alinement with the piston to close the conduit while the passage in the piston is open and to open the conduit while said passage is closed.

5. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a conduit for the liquid and a piston operating wholly within the conduit and containing a passage therethrough for the liquid, means to reciprocate the piston, a valve carried within the piston and adapted to alternately close and open said passage, a spring to seat the valve and thereby close the passage during the outstroke and part of the instroke of the piston, another valve mounted in the conduit below and in alinement with the piston and adapted to alternately open and close the conduit, and means comprising a spring to seat said last mentioned valve and thereby close the conduit during the instroke of the piston, both said valves operating at all times below the level of said liquid.

6. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a conduit for the liquid having a downwardly extending part and extending from said reservoir to the place of delivery, a piston operating wholly within the downwardly extending part of the conduit and containing a passage therethrough for the liquid, means to reciprocate the piston, a valve carried within the piston and adapted to alternately close and open said passage, another valve carried within the conduit below and in alinement with the piston and adapted to alternately open the conduit when said passage is closed and close the conduit when said passage is open said piston and both said valves operating at all times below the level of said liquid.

7. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a liquid conduit extending from the bottom of the reservoir to the place of delivery, a piston operating wholly within the conduit at all times below the level of the liquid in the reservoir, said piston having a passage therethrough for the liquid, means to reciprocate the piston, a valve slidable within the piston to alternately close and open said passage, and another valve arranged within the conduit below the lower limit of the piston movement to close said conduit while said passage is open and to open said conduit when said passage is closed.

8. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a conduit extending from the reservoir to the place of delivery of the liquid and in part downwardly from the reservoir; a piston reciprocating wholly within said downwardly extending part of the conduit at a location below the liquid in the reservoir and containing a therethrough passage communicating at each end thereof with the conduit; means to reciprocate the piston; means slidable within the piston to close said passage during the outstroke and to open the passage during the instroke of the piston, and a spring-pressed valve mounted in the conduit beyond the limit of the outstroke of the piston and in alinement therewith to close the conduit against the tension of said spring during the instroke and open the conduit during the outstroke of the piston.

9. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a conduit extending from the reservoir to the place of delivery of the liquid and in part downwardly from the reservoir; a piston operating wholly within said downwardly extending part at all times below the liquid in the reservoir and containing a therethrough passage communicating at each end thereof with the conduit; means to reciprocate the piston; means carried by the piston normally closing said passage during the outstroke but allowing the passage to be opened during the instroke of the piston, and means mounted in the conduit beyond the limit of the outstroke of the piston and in alinement therewith normally closing the conduit during the instroke but opening the conduit during the outstroke of the piston.

10. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a therefrom downwardly extending conduit therefor comprising a cylinder; a piston reciprocating wholly within said cylinder and containing a therethrough passage for the liquid; a valve seat carried within the piston and traversed by said passage; a valve member carried within the piston and sliding relatively thereto to cooperate with said seat; and means to reciprocate the piston whereby on its outstroke from the reservoir the valve is actuated by a lost-motion movement and seated to close, and on the instroke is oppositely actuated and unseated to open, the passage.

11. In a vacuum pump, an air-tight reservoir for the liquid; means adapted for maintaining a constant vacuum pressure in the upper portion thereof and above the normal level of the liquid; means for supplying and introducing liquid thereto including means within the reservoir automatically controlling said supply to maintain a predetermined normal liquid level; a downwardly extending conduit having a cylinder; a piston reciprocating wholly within said cylinder and containing a therethrough passage for the liquid; means to reciprocate the piston comprising a therewith slidably connected piston rod; a bearing in which the rod is reciprocatably mounted; a valve seat carried by the piston around said passage; and a valve head carried by the rod cooperatively with said seat whereby during instrokes the valve head is unseated by the rod to open the passage and caused to engage with said bearing to lift the piston and during outstrokes is seated by the rod to close the passage and lower the piston.

12. In a vacuum pump, an air-tight reservoir for the liquid; means adapted for maintaining a constant vacuum pressure in the upper portion thereof and above the normal level of the liquid; means for supplying liquid to the reservoir located below said air-exhausting means; means connected with said liquid supplying means for automatically controlling the liquid inflow to maintain a predetermined normal liquid level in said reservoir; a conduit extending downwardly from said reservoir including a cylinder located below the normal liquid level; a piston reciprocating wholly within said cylinder and having a therethrough passage for the liquid from said conduit; a reciprocating piston rod slidably connected with said piston; a bearing in said piston in which said rod is slidably mounted; a valve seat formed in said piston around said passage; and a valve head carried by said piston rod to cooperate with said seat within said passage whereby during instrokes the valve head is unseated by the rod to open said passage and engage said bearing positively to lift the piston and during outstrokes said valve head is positively seated by the rod to close the passage and lower said piston within the cylinder.

13. In a vacuum pump having an airtight reservoir for the liquid with the upper portion forming an exhaust chamber, an air-tight conduit extending downwardly from said reservoir, a piston slidable in said conduit, a reciprocable piston rod passing upwardly through the top of said reservoir, and an upwardly flaring drip collector so secured to said rod as to be reciprocated thereby only in said exhaust chamber.

14. In a vacuum pump having an airtight reservoir for the liquid with the upper portion forming an exhaust chamber above the level of the liquid, an air-tight conduit extending downwardly from said reservoir, a piston slidable in said conduit, a reciprocable piston rod passing upwardly through the top of said reservoir, and an upwardly flaring drip collector so secured to said rod as to be reciprocated thereby only in said exhaust chamber and always above said liquid level.

15. In a vacuum pump, an air-tight reservoir for the liquid, means for maintaining the liquid therein at a predetermined level so as to form an exhaust chamber in said reservoir above said liquid, a piston rod extending through the top of said reservoir and vertically reciprocable within said reservoir, and an upwardly flaring drip collector carried by said rod so as to be reciprocated thereby only in said exhaust chamber.

BURT E. TAYLOR.